United States Patent [19]

Portugall

[11] Patent Number: 4,731,432
[45] Date of Patent: Mar. 15, 1988

[54] COMPLETELY AROMATIC POLYESTERS AND THEIR PREPARATION

[75] Inventor: Michael Portugall, Wachenheim, Fed. Rep. of Germany

[73] Assignee: BASF Aktiengesellschaft, Ludwigshafen, Fed. Rep. of Germany

[21] Appl. No.: 664,785

[22] Filed: Oct. 25, 1984

[30] Foreign Application Priority Data

Oct. 26, 1983 [DE] Fed. Rep. of Germany ....... 3338805

[51] Int. Cl.$^4$ .............................................. C08G 63/60
[52] U.S. Cl. ..................................... 528/190; 528/173; 528/271
[58] Field of Search .................. 528/190, 271, 173

[56] References Cited

U.S. PATENT DOCUMENTS

| | | | |
|---|---|---|---|
| 3,975,487 | 8/1976 | Cottis et al. | 264/210.6 |
| 4,118,372 | 10/1978 | Schaefgen | 528/190 |
| 4,184,996 | 1/1980 | Calundann | 528/190 |
| 4,188,476 | 2/1980 | Irwin | 528/190 |
| 4,311,824 | 1/1982 | Fayolle | 528/190 |
| 4,375,530 | 3/1983 | Hay | 528/190 |
| 4,487,916 | 12/1984 | Irwin | 528/190 |
| 4,564,669 | 1/1986 | Dicke et al. | 528/173 |

OTHER PUBLICATIONS

Handbook of Liquid Cristals, Verlag Chemie Weinheim, 1980, pp. 69–113, K. H. Illers, "Makromol Chem.", 127 (1960), S. 1 ff.

Primary Examiner—Lucille M. Phynes
Attorney, Agent, or Firm—Keil & Weinkauf

[57] ABSTRACT

Completely aromatic polyesters which form a liquid-crystalline filament-forming melt at below 300° C. and essentially consist of
(a) from 3 to 15 mol % of units derived from hydroquinone,
(b) from 5 to 35 mol % of units derived from 2,7-dihydroxynaphthalene,
(c) molar amounts, equivalent to the sum of (a) and (b), of units derived from terephthalic acid, and
(d) from 10 to 70 mol % of units derived from p-hydroxybenzoic acid, and their preparation.

6 Claims, No Drawings

COMPLETELY AROMATIC POLYESTERS AND THEIR PREPARATION

The present invention relates to completely aromatic polyesters which form a liquid-crystalline, filament-forming melt at below 300° C., and to their preparation.

A number of completely aromatic liquid-crystalline polyesters have been described. U.S. Pat. No. 4,375,530 discloses polyesters which contain units derived from 2,6-dicarboxynaphthalene and 2,6-dihydroxynaphthalene. The polyesters described there have a relatively high softening point and require processing temperatures of above 300° C., which is undesirable when such polyesters are further processed.

Furthermore, U.S. Pat. No. 4,118,372 describes liquid-crystalline polyesters in which some of the inert components present can be units derived from 2,7-dihydroxy- or 2,7-dicarboxynaphthalene. The polyesters listed there exhibit unsatisfactory sustained-use performance at elevated temperatures.

Both patents describe the preparation of polyesters by methods which are known in principle. In the case of the acidolysis, ie. the conversion of the free acids, the use of hydroxy compounds which have been acylated (in particular acetylated) beforehand is described. This is involved and expensive, since the corresponding phenols or hydroxy compounds first have to be converted to the acyl compounds in a separate step, and the acyl compounds then have to be isolated and dried before they can be used in the polycondensation.

German Laid-Open Application DOS No. 2,517,957 describes completely aromatic polyesters which are prepared from the underivatized monomeric dihydroxy or dicarboxy compounds, using acetic ahydride, the reaction times stated being more than 15 hours under elevated temperatures. The polymers obtained likewise have to be processed at above 300° C., which is undesirable.

It is an object of the present invention to provide completely aromatic liquid-crystalline polyesters which permit low processing temperatures but have good sustained-use characteristics at elevated temperatures and are obtainable by a simpler preparation process.

We have found that this object is achieved by completely aromatic polyesters which form a liquid-crystalline filament-forming melt at below 300° C. and essentially consist of (a) from 3 to 15 mol % of units derived from hydroquinone,

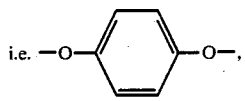

(b) from 5 to 34 mol % of units derived from 2,7-dihydroxynaphthalene,

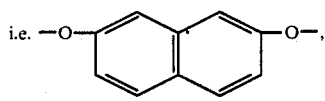

(c) molar amounts, equivalent to the sum of (a) and (b), of units derived from terephthalic acid

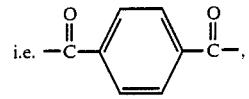

and (d) from 10 to 39.4 mol % of units derived from p-hydroxybenzoic acid,

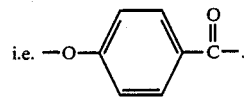

The novel completely aromatic liquid-crystalline polyesters have the advantage that they do not require a high processing temperature and furthermore exhibit good sustained-use characteristics even at elevated temperatures. Moreover, the said polyesters possess high rigidity, strength and toughness, have a smooth surface and can be prepared economically by a single-vessel process.

The novel completely aromatic liquid-crystalline polyesters are noteworthy in that the theory of liquid-crystalline compounds requires a molecular arrangement of groups whose directions of substitution are along the direction of the longitudinal axis of the molecule, as is evident from Handbook of Liquid Crystals, Verlag Chemie Weinheim, 1980, pages 69–113. This requirement is met by aromatic compounds obtained from starting materials having the reactive groups in the p-position. Units derived from 2,7-dihydroxynaphthalene therefore appear to be unsuitable.

U.S. Pat. No. 4,118,372, too, states that units derived from 2,7-disubstituted naphthalene starting materials may give rise to a troublesome effect in liquid-crystalline polyesters. This is confirmed by virtue of the fact that 2,7-dihydroxynaphthalene, 4,4'-dihydroxydiphenyl sulfone and bisphenol A do not have a mesogenic character, which is required for the formation of liquid-crystalline polyesters, as is evident from Handbook of Liquid Crystals, Verlag Chemie Weinheim, 1980, pages 69–113.

The polyesters according to the invention consist of from 3 to 15 mol % of units derived from hydroquinone, from 15 to 35 mol % of units derived from 2,7-dihydroxynaphthalene, molar amounts, equivalent to the sum of the amounts of the dihydroxy compounds, of units derived from terephthalic acid, and from 10 to 39.4 mol % of units derived from p-hydroxybenzoic acid.

Preferred polyesters consist of from 5 to 12 mol % of units derived from hydroquinone, from 20 to 35, in particular from 25 to 35, mol % of units derived from 2,7-dihydroxynaphthalene, amounts, equivalent to the amount of the dihydroxynaphthalene, of units derived from terephthalic acid, and from 30 to 39.4 mol % of units derived from p-hydroxybenzoic acid, the sum of the amounts being 100 mol %.

Advantageously, the aromatic polyesters contain one or moe repeating units derived from 4,4'-dihydroxybiphenyl i.e. 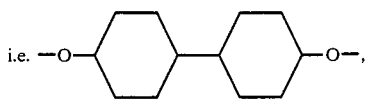

bis-(4-hydroxyphenyl) sulfone i.e. 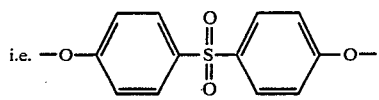

and/or 2,2-bis-(4-hydroxyphenyl)-propane i.e. 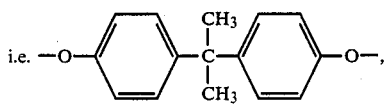

in particular in amounts of from 2 to 20, especially from 2 to 17, mol %. In each case, the amount of terephthalic acid used is equivalent to the sum of the amounts of dihydroxy compounds.

Preferred completely aromatic liquid-crystalline polyesters have a glass transition temperature of $\geq 120°$ C. The glass transition temperature should be measured by the DSC method, as described by K. H. Illers in, inter alia, Makromol. Chem. 127 (1969), page 1 et seq. Other preferred liquid-crystalline polyesters are those which form a liquid-crystalline filament-forming melt at $<290°$ C.

The copolyesters according to the invention can be obtained by a number of methods, as stated in, for example, U.S. Pat. No. 4,375,530 and 4,118,372. In particular, these copolyesters are obtained by polycondensation of terephthalic acid and a p-acyloxybenzoic acid with the appropriate acyl compounds of the dihydroxy components of the polyesters. Compounds which are particularly useful for this purpose are the esters of the hydroxy compounds with lower fatty acids, for example their acetates or diacetates.

It has proven advantageous to prepare the novel polyesters in a single-vessel process, starting from the underivatized, commercially available hydroxy or carboxy compounds, and using anhydrides of lower fatty acids, in particular acetic anhydride.

In this procedure, in dry starting materials together with not less than a 5% molar excess, based on the hydroxyl groups present, of, for example, acetic achydride are heated, under an inert gas atmosphere and while stirring vigorously, to a temperature at which a substantial refluxing is observed. The bath temperature is kept at 130°-170° C. for not more than 5, preferably not more than 2, hours, and is then slowly increased to about 250°-350° C. Excess acetic anhydride and acetic acid are distilled off during this procedure. To remove the acetic acid formed during the reaction, the pressure can be reduced toward the end of the condensation, for example to 0.5 mbar.

The fact that the reaction takes place completely and without problems and in the absence of added catalyst to give the desired polymers in a relatively short time is noteworthy and could not be predicted for this single-vessel process. This is all the more surprising since the large number of chemically different hydroxyl groups were expected to result in a range of reactivities and hence an unsatisfactory polymeric structure.

The resulting completely aromatic liquid-crystalline polyesters can be further condensed in the solid state, for example at 150°-250° C., until the desired viscosity is achieved. This process can be carried out either before or after thermoplastic processing.

The novel completely aromatic liquid-crystalline polyesters are useful for producing filaments, films, foams and industrial moldings by injection molding or extrusion.

The Examples which follow illustrate the invention.

EXAMPLE 1

0.025 mole of hydroquinone, 0.025 mole of 4,4'-dihydroxybiphenyl, 0.05 mole of 2,7-dihydroxynaphthalene, 0.125 mole of 4-hydroxybenzoic acid (38.5 mol % based on the total amount of monomers), 0.1 mole of terephthalic acid and 0.86 mole of acetic anhydride were stirred under a nitrogen atmosphere for 30 minutes at 130° C. and then heated at 150° C., after which the temperature was increased to 290° C. in the course of 2.3 hours. During this procedure, 93 g of distillate were obtained.

The pressure was then reduced to 5 mbar in the course of 55 minutes at 290° C., after which stirring was continued for a further 45 minutes at this temperature. A highly viscous filament-forming melt was obtained. The polymer melt and the cold polymer exhibited a nacreous luster. The polymer has a glass transition temperature of 121° C., determined by differential scanning calorimetry (DSC), and an intrinsic viscosity of 1.8 dl/g, measured in a 0.1% strength by weight solution in pentafluorophenol at 60° C.

After the polymer had been stored for 14 hours at 200° C. and under 20 mbar, the viscosity increased to 3.5 dl/g. Between cross polarizers under the polarization microscope at 290° C., the polymer exhibited textures typical of liquid-crystalline polymers.

COMPARATIVE EXAMPLE (without 2,7-dihydroxynaphthalene)

0.05 mole of hydroquinone, 0.05 mole of 4,4'-dihydroxybiphenyl, 0.125 mole of 4-hydroxybenzoic acid, 0.1 mole of terephthalic acid and 0.86 mole of acetic anhydride were condensed by the process described in Example 1. The required final temperature was 300° C. The polymer melt has a pasty consistency at 300° C. and was not filament-forming. Furthermore, the polymer had a brown non-lustrous surface and was brittle.

EXAMPLE 2

0.025 mole of hydroquinone, 0.05 mole of 2,7-dihydroxynaphthalene, 0.025 mole of 4,4'-dihydroxydiphenyl sulfone, 0.1 mole of terephthalic acid, 0.125 mole of 4-hydroxybenzoic acid (38.5 mol % based on the total amount of monomers) and 0.35 mole of acetic anhydride were condensed as described in Example 1. The final temperature was 280° C. A highly viscous filament-forming polymer was obtained. The cold polymer was highly rigid and tough, and its surface exhibited a nacreous luster. It had a glass transition temperature of 127° C. determined by DSC, and an intrinsic viscosity of 1.7 dl/g.

COMPARATIVE EXAMPLE 0.025 mole of hydroquinone, 0.05 mole of 1,5-dihydroxynaphthalene, 0.025 mole of 4,4'-dihydroxydiphenyl sulfone, 0.1 mole of terephthalic acid, 0.125 mole of 4-hydroxybenzoic acid and 0.35 mole of acetic anhydride were condensed as described in Example 1. The resulting polymer melt had a pasty consistency and was not filament-forming. The cold polymer has a greenish brown color and a non-lustrous surface and was brittle. The intrinsic viscosity was 1.0 dl/g.

EXAMPLE 3

0.015 mole of hydroquinone, 0.085 mole of 2,7-dihydroxynaphthalene, 0.1 mole of terephthalic acid, 0.13 mole of 4-hydroxybenzoic acid (39.4 mol % based on the total amount of monomers) and 0.45 mol of acetic anhydride were condensed as described in Example 1, the final temperature in the condensation procedure being 300° C. The highly viscous filament-forming polymer obtained had a nacreous luster, a smooth surface, high rigidity and great toughness. The intrinsic viscosity was 0.8 dl/g, and the glass transition temperature was 138° C.

EXAMPLE 4

0.015 mole of hydroquinone, 0.05 mole of 2,7-dihydroxynaphthalene, 0.035 mole of 4,4'-dihydroxydiphenyl sulfone, 0.1 mole of terephthalic acid, 0.13 mole of 4-hydroxybenzoic acid (39.4 mol % based on the total amount of monomers) and 0.45 mole of acetic anhydride were condensed as described in Example 1, the final temperature in the condensation procedure being 300° C. The highly viscous filament-forming polymer obtained possessed high rigidity, a nacreous luster and a smooth surface. The intrinsic viscosity was 0.9 dl/g, and the glass transition temperature was 142° C.

I claim:

1. A completely aromatic polyester which forms a liquid-crystalline filament forming melt at below 300° C. and consists essentially of (a) from 3 to 15 mol% of units having the structural formula

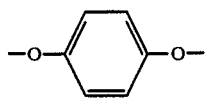

(b) from 5 to 35 mol% of units having the structural formula

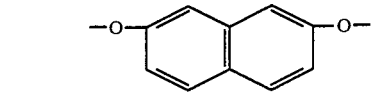

(c) molar amounts, equivalent to the sum of (a) and (b), of units having the structural formula

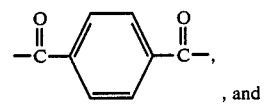, and (d) from 10 to 39.4 mol% of units having the structural formula

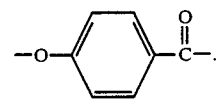.

2. A completely aromatic polyester as defined in claim 1, wherein a portion of the repeating units (a) and (b) are replaced by units having the formula

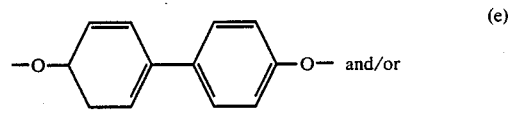

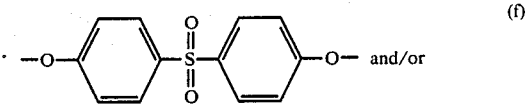

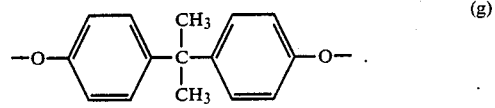

3. A completely aromatic polyester as defined in claim 2, which contains one or more of the repeating units (e), (f) and/or (g) in an amount of from 2 to 20 mol %.

4. A completely aromatic polyester as defined in claim 2, which contains the repeating unit (b) and one or more repeating units (e), (f) and/or (g) in a total amount of from 25 to 40 mol %.

5. A completely aromatic polyester as defined in claim 1, wherein the amount of units from (b) is from 25 to 35 mol %.

6. A process for the preparation of a completely aromatic polyester as defined in claim 1, wherein the monomers, in the form of underivatized hydroxy or carboxy compounds in the molar ratios described, are converted to the polyester in a single-vessel process, with the addition of excess fatty acid anhydride.

* * * * *